(12) United States Patent
Passman et al.

(10) Patent No.: US 6,362,901 B1
(45) Date of Patent: Mar. 26, 2002

(54) DOCUMENT SCANNING SYSTEM

(75) Inventors: Andrew Passman, West Tyhtherley;
Christopher David Stone, Winchester;
David Gordon Fox, Bognor Regis;
Frederick Joseph Preston,
Southampton, all of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/129,491

(22) Filed: Aug. 4, 1998

(30) Foreign Application Priority Data

Jan. 14, 1998 (GB) .............................. 9800638

(51) Int. Cl.[7] .................................. H04N 1/04
(52) U.S. Cl. ....................... 358/453; 382/167
(58) Field of Search ................... 358/453, 448, 358/434, 462, 412, 474, 500, 400, 498, 505, 504, 518, 520, 538, 509; 382/167, 169

(56) References Cited

U.S. PATENT DOCUMENTS 4,958,217 A * 9/1990 Kimura ................ 358/75

FOREIGN PATENT DOCUMENTS

| GB | 2 241 406 A | 8/1991 | .......... H04N/1/116 |
| GB | 2241406 A | 8/1991 | |
| JP | 08083317 A | 3/1996 | .......... H04N/7/387 |
| JP | 08335249 A | 12/1996 | ............ G06K/9/20 |

OTHER PUBLICATIONS

IBM Technical Disclosure Bulletin vol. 29, No. 5, Oct. 1986, pp. 2130–2133.

IBM Technical Disclosure Bulletin, "Field–Oriented Scanning System", vol. 29, No. 5, Oct. 1986.

* cited by examiner

*Primary Examiner*—Jerome Grant, II
*Assistant Examiner*—Negussie Worku
(74) *Attorney, Agent, or Firm*—Thomas A. Beck; Louis P. Herzberg

(57) ABSTRACT

A document scanning system (10) communicates with a scanner (40) to provide scanning characteristics and scanning coordinates for a scan and to receive a scanned image (FIG. 3) from the scanner. The document scanning system processes scanning requests from an application (20), defines a set of images to be scanned and calculates the scanning characteristics (colour depth, resolution, brightness, contrast) and scanning coordinates from a document set definition comprising one or more image definitions. Each image definition includes an associated set of coordinates and scanning characteristics for the or each image. A configuration file (30) stores the document set definition and the document scanning system comprises a parser module (12) adapted to read the configuration file.

12 Claims, 5 Drawing Sheets

FIG. 4

```
DOCUMENT_SET_START
        < DOCUMENT SET DESCRIPTION >
    DOCUMENT_START
        < DOCUMENT DESCRIPTION >
        IMAGE_START
            < IMAGE DESCRIPTION >
        IMAGE_START
            < IMAGE DESCRIPTION >
        IMAGE_START
            < IMAGE DESCRIPTION >
    DOCUMENT_START
        < DOCUMENT DESCRIPTION >
        IMAGE_START
            < IMAGE DESCRIPTION >
        IMAGE_START
            < IMAGE DESCRIPTION >
        IMAGE_START
            < IMAGE DESCRIPTION >
DOCUMENT_SET_START
etc.
```

FIG.5

| DOCUMENT SET ID | DOCUMENT ID OR INDEX | IMAGE ID | START INDEX | END INDEX | RESULT |
|---|---|---|---|---|---|
| 1000 | (INDEX) 1 | (INDEX) 1 | 0 | 0 | THE FIRST IMAGE WITHIN THE FIRST DOC IS CAPTURED |
| 1000 | (INDEX) 1 | (INDEX) 0 | 1 | 9 | IMAGES 1 THROUGH 9 OF THE FIRST DOC IS CAPTURED |
| 1000 | (INDEX) 1 | (INDEX) 0 | 0 | 0 | ALL IMAGES ON THE FIRST DOC ARE CAPTURED |
| 1000 | (INDEX) 0 | (INDEX) 0 | 2 | 4 | ALL IMAGES FROM THE 2nd TO THE 4th DOCUMENT IN THE SET ARE CAPTURED |
| 1000 | (INDEX) 0 | (INDEX) 0 | 0 | 0 | ALL IMAGES ON ALL DOCUMENTS WITHIN THE SET ARE CAPTURED |
| 0 | (ID) 100 | (INDEX) 0 | 0 | 0 | DOCUMENT WITH ID 100 IS DIVORCED FROM THE SET; ALL IMAGES ARE CAPTURED |

DOCUMENT SCANNING SYSTEM

FIELD OF THE INVENTION

The present invention relates to a document scanning system.

BACKGROUND OF THE INVENTION

A flat bed scanner includes a platter onto which a document can be placed or automatically fed. Scanner software is known which enables a user to specify a rectangular area of the platter, or all of the platter, to be scanned and scanning characteristics, for example, resolution, colour depth, brightness, contrast to be employed for the scan.

Documents such as identity papers, driving licenses, passports etc. may include images such as a photograph, several fingerprints, a bar code, a signature or even text blocks. Many organizations or governments are currently trying to build up databases of such information in a computer readable form, and in order to do this the documents need to be scanned. A set of such documents associated with a person could contain several different images which require a different set of scanning characteristics. For example, a photograph may need to be scanned at a colour resolution of 300 dpi and a 24-bit colour depth, whereas a bar code could be scanned at 70 dpi in monochrome with a high contrast and a fingerprint may need to be scanned at 150 dpi in 8-bit grey scale.

A scanner can take several seconds to complete a scan, depending on the area to be scanned and the scanning characteristics. If done manually, setting the characteristics for a scan could take several seconds. If each document in a set or each image in a document were to be scanned separately with its own scanning characteristics, then the process of acquiring information would take too long. Alternatively, if a complete document or document set were scanned once at the maximum required resolution and colour depth of any image in the document set, disk storage space required for the scanned image would be prohibitive and still characteristics such as brightness and contrast could be less than optimal for individual images within the document.

DISCLOSURE OF THE INVENTION

According to the present invention there is provided a document scanning system adapted to communicate with a scanner to provide scanning characteristics and scanning coordinates for a scan and to receive a scanned image from said scanner, said document scanning system being adapted to process scanning requests defining a set of images to be scanned and to calculate said scanning characteristics and scanning coordinates from a document set definition comprising one or more image definitions, each image definition including an associated set of coordinates and scanning characteristics for the or each image.

The invention enables a document set, comprising one or more documents, to be placed on a scanner platter and to be scanned in one pass of the scanner across the platter. The single scanned image can then be processed into several images, each of which may then be manipulated into a required resolution and colour depth. The invention thus saves a) storage space, by only storing the required images at their required resolution and colour depth, and b) time, by eliminating many repetitive scans for each image required.

BRIEF DESCRIPTION OF THE DRAWINGS

FIG. 4 shows the grammar for the configuration file of FIG. 1; and

FIG. 5 describes results returned by the document scanning system to the application of FIG. 1 on various values of an image descriptor.

DISCLOSURE OF THE PREFERRED EMBODIMENT

Figure 1:
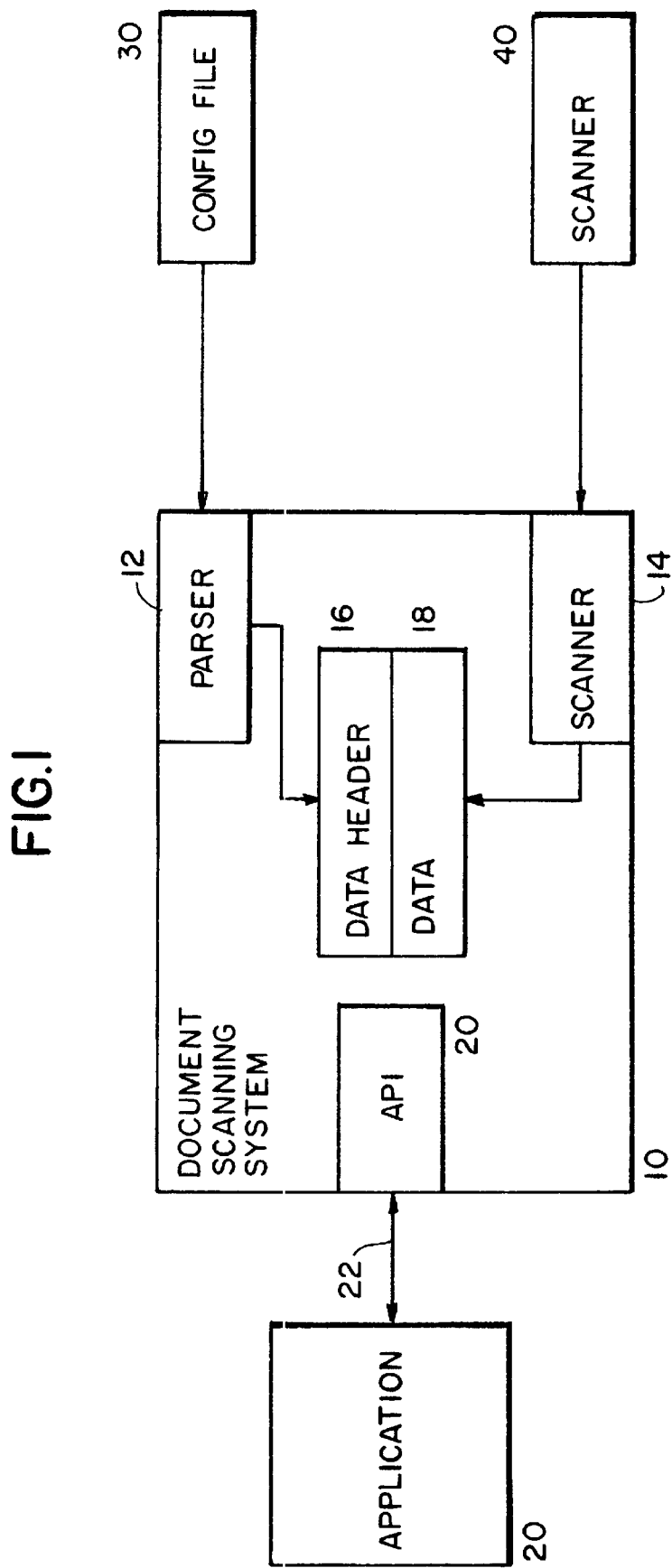
FIG. 1 is a schematic diagram of a document scanning system according to the present invention.

Referring now to FIG. 1, a document scanning system according to the present embodiment is implemented in a multi-programming computer system as a kernel program 10 to which one or more application programs 20 (only one shown) can communicate. The kernel preferably comprises a parser module 12 which can read a configuration file 30 to determine the layout and scanning characteristics of a document set to be scanned, FIG. 2. By separating the configuration file 30 from the kernel 10, the document scanning system of the present embodiment can be easily adapted to operate with different document sets. It will be seen, however, that if minimum storage space for program code and maximum program initialisation speed are essential, the configuration file information could be built into the kernel 10 and/or the kernel could be built into the application program 20. This, however, does not facilitate ease of re-engineering.

Furthermore, the kernel 10 either includes an integrated scanner module 14 or communicates with 3rd party scanner software to instruct a scanner 40, preferably a flat bed scanner, to scan an image. The scanner software instructions include scanning characteristics at which a scan should be made. These include rectangular coordinates defining an area of the scanner platter to be scanned, colour depth, resolution, brightness, contrast etc.

Figure 2:
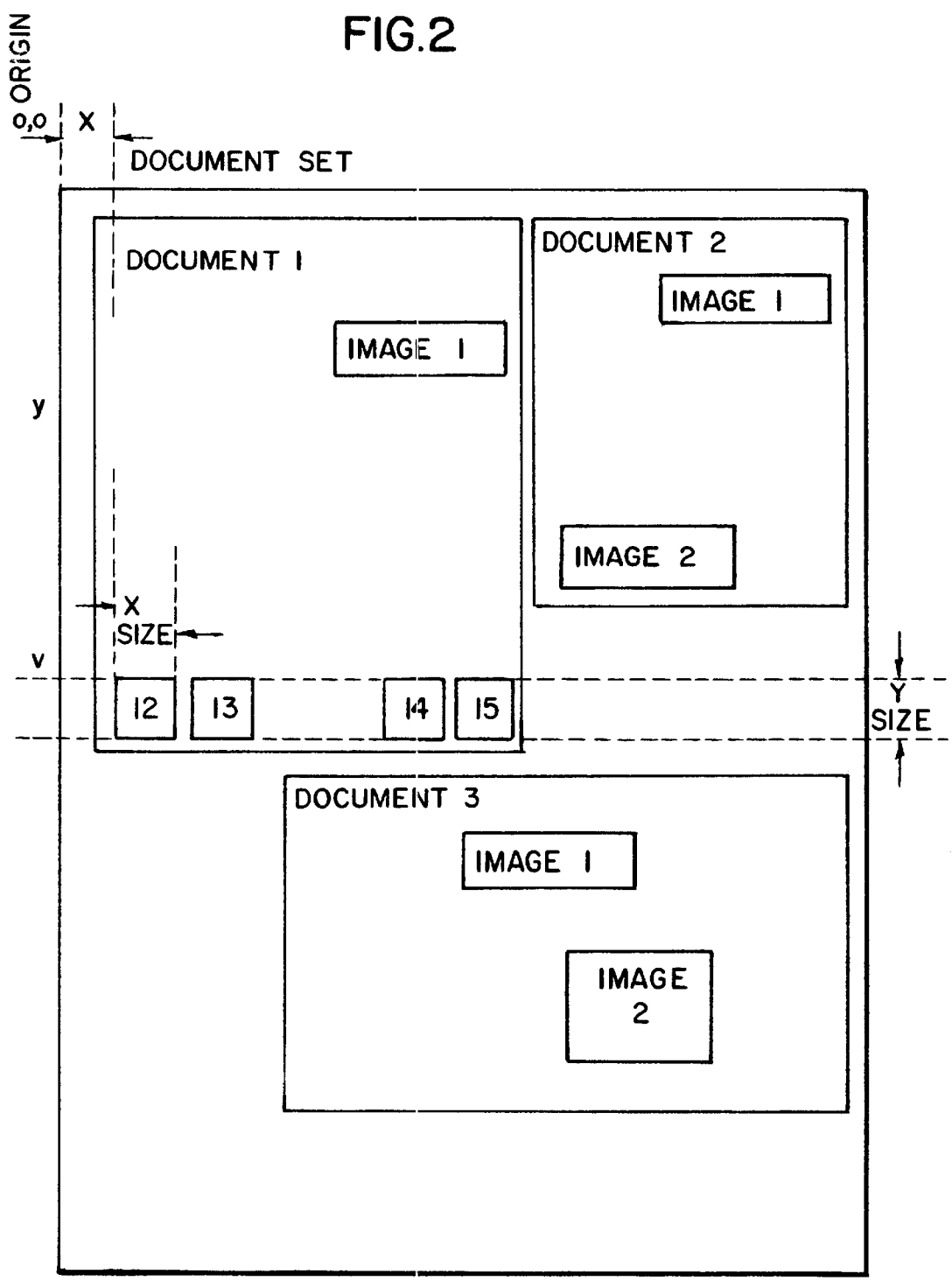
FIG. 2 is a schematic diagram of a document set to be scanned by the scanning system of FIG. 1.

The configuration file 30 describes a document set, documents within that set and any images in each document. The grammar of the configuration file is shown in FIG. 4, an example of a configuration file is given in Table 1 and an example of a document set defined by a configuration file is shown in FIG. 2.

A document set is preferably defined in terms of: a start x, y position of the document set on the scanner platter, and also a maximum offset in the x and y direction of the documents within the document set. In the example of FIG. 2, the start x, y position of the document set is 0, 0 meaning that the document set begins in the top left corner of the scanner platter. Maximum colour depth, maximum resolution, optimal brightness and optimal contrast across all documents are also defined for the document set.

Referring to FIG. 4, a <document set description> section of the configuration file defines the document set in terms of:

Name—The name of the document set. This may be something like "Citizens documents" or "Personnel documents".

Document Set ID—this is a number given to identify the document set between 0 and 32000

Xstart—the start of the document set on the X axis on the platter of the flat bed scanner Ystart—the start of the document set on the Y axis Xsize—the size of the document set on the X axis, that is, the offset in inches from Xstart Ysize—the size of the document set on the Y axis Brightness & Contrast—scalable factors used to adjust the brightness and contrast of the image taken on the scanner. These will be the optimum values across all the documents within the document set which produce the best (subjective) result.

Capture mode—an integer value indicating colour depth/resolution: Black and White only (0), 256 shades of grey (1) or 24 bit colour image (2). The value set for the document set will be the value which best suits all the documents within the document set (usually the maximum).

Resolution—a scalable value used to adjust the resolution (dpi) of the images captured on the scanner.

This value will be the value which best suits all the documents in the document set (usually the maximum).

Each document in a document set is preferably defined in terms of: x, y location and x, y document size in inches. The document definition also includes colour depth and resolution parameters equivalent to the respective maximum values described within the image areas of the document. A <document description> section of the configuration file describes each document in terms of:

Name—this is a name given to the document and may, for example, be "Driving license" or "identity card"

Document ID—this is a unique number given to the a document to be scanned. This number is to be unique within the document scanning system. This value is preferably between 0 and 1000

Xstart—the start of the document on the X axis on the platter of the scanner

Ystart—the start of the document on the Y axis

Xsize—the size of the document on the X axis

Ysize—the size of the document on the Y axis

Brightness & Contrast—scalable factors used to adjust the brightness and contrast of the image taken on the scanner. These will be the values which best suit all the images within the document.

Capture mode—an integer value indicating Black and White only (0), 256 shades of grey (1) or 24 bit colour image (2). The value set for the document will be the maximum value across all the images within the document.

Resolution—a scalable value used to adjust the resolution of the images captured on the scanner. This value will be the maximum value across all the images in the document.

Each image area is preferably defined in terms of: location; size; colour depth; resolution; and image type. In the configuration file, an <image description> section defines each image in terms of:

Name—a name given to the image like "photograph of face" or "right index fingerprint"

Image ID—a number given to the image to be used as an unique identifier within the document. This value is preferably between 0 and 100.

Xstart—the start of the image on the X axis on the platter of the flat bed scanner (shown as X for Image 12 in FIG. 2)

Ystart—the start of the image on the Y axis (shown as Y for Images 12 . . . 15 in FIG. 2)

Xsize—the size of the image on the X axis

Ysize—the size of the image on the Y axis

Brightness & Contrast—scalable factors used to adjust the brightness and contrast of the image taken on the scanner. These will be the values required to capture this image and may not be the same values used to capture the document or the document set.

Capture mode—an integer value indicating Black and White only (0), 256 shades of grey (1) or 24 bit colour image (2). The value set for the image will be the value required for this image area and may not be the value used for capturing the whole document or the document set.

Resolution—a scalable value used to adjust the resolution of the image captured on the scanner. This value will be set for this image and may not be the value used for the complete document or the document set.

Additional values, as shown in Table 1, for image descriptions over that of the documents or document sets are:

Class—this value indicates the type of image being described this can be a photograph, signature, bar code, finger print etc.

Sub-class—right or left finger prints [each individual finger and thumb].

Impression—live or non-live scan, rolled print or dabbed print.

Figure 3:
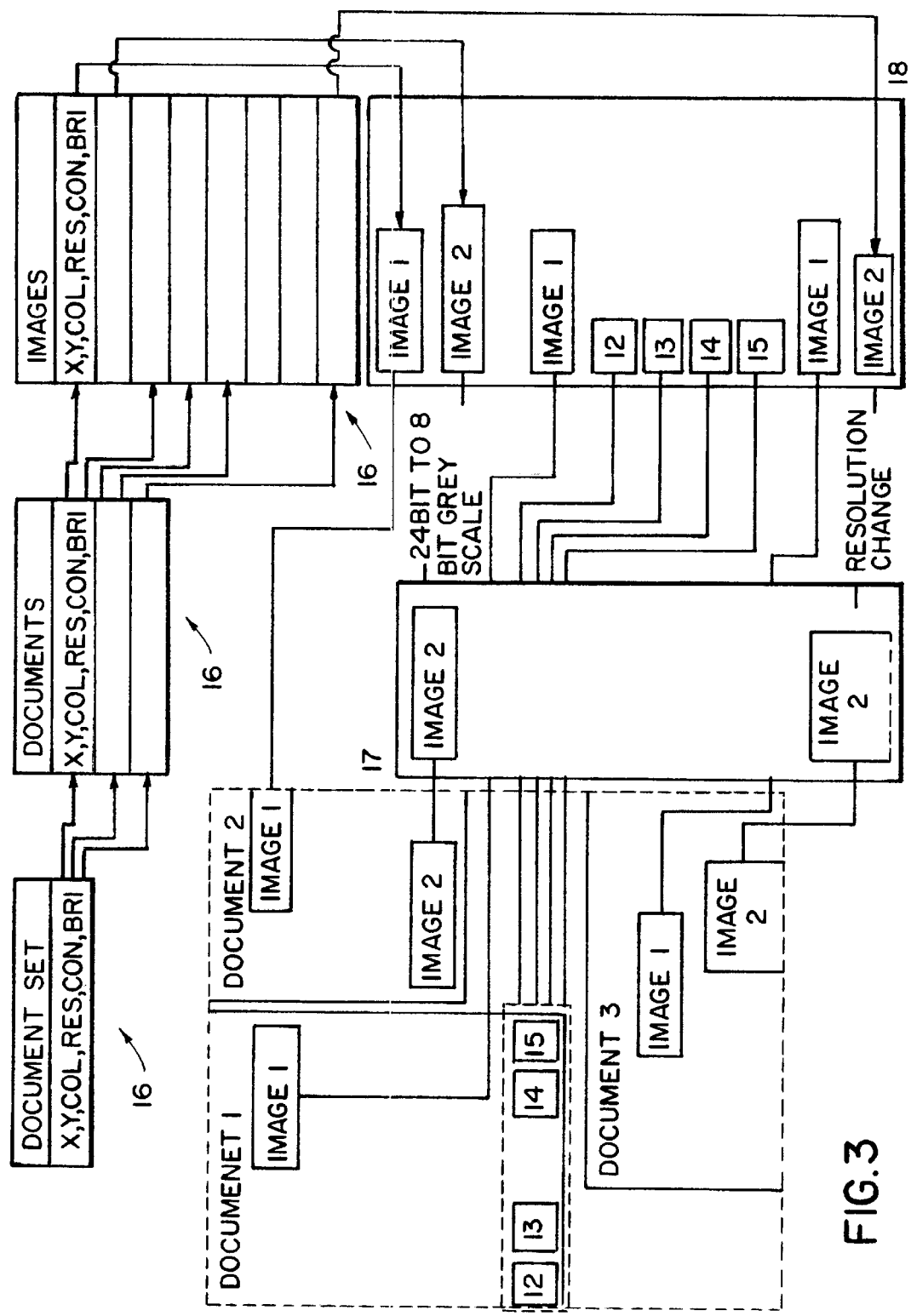
FIG. 3 illustrates an area of the document set of FIG. 2 to be scanned.

The parser 12 reads the document information in the configuration file 30 in response to an initialisation command received by the document scanning system from the application 20. The parser 12 stores the data from the configuration file 30 in linked lists for use in processing the document sets, documents and images. FIG. 3 illustrates the logical relationship between nodes in the linked list. The linked list primarily forms a header 16 which also contains pointers to image data 18 acquired from the scanner.

The document scanning system 10 provides an API 19 enabling the application 20 to initiate image capture and processing. The API defines an image descriptor 22, which the application 20, for example, after some user interaction, uses to request images that are to be retrieved. The image descriptor 22 can be passed to the document scanning system or can be in the form of an image descriptor structure within the document scanning system 10. In any case, the image descriptor structure preferably contains a number of fields:

Document_Set_ID;

Document_ID or Index;

Image_ID; and

StartIndex, EndIndex.

StartIndex and EndIndex are used to specify ranges of images or documents within a document set, from which information is to be gathered. This allows the application 20 to request the document scanning system 10 to acquire information from a sub-set of images from the document set, thus speeding up acquisition time. If we take the Document_Set_ID field as the highest level field in the structure, then the StartIndex and EndIndex fields reference the range of the highest null field of the structure.

FIG. 5 describes the images to be acquired according to the values of the image descriptor structure, StartIndex and EndIndex. In the first example of FIG. 5, each level of the structure is specified and thus StartIndex and EndIndex are not required, and a single image 1 of document 1 is acquired. In this case, the scanning characteristics for this image will be used for the scan.

In the second example, the highest null field is Image_ID and so StartIndex and EndIndex define a range from image 1 to image 9 of the specified document 1. In this case, the scanning characteristics for document 1 will be used for the scan.

In the following example, the highest null field is again Image_ID, and StartIndex and EndIndex are set to 0, (or any pre-determined number), instructing that the entire set of images for the specified document are to be acquired. Again, the scanning characteristics for document 1 will be used for the scan.

The following two examples apply the same rule to acquiring ranges of documents, including all their images, from a document set. In these cases, the scanning characteristics for the document set will be used for the scan.

In the previous examples, documents or images are defined in the image descriptor structure by relative indices. In the second example, the 1st to 9th images are captured, and in the fourth example, the 2nd to 4th documents are captured. In the last example of FIG. 5, however, the Document_ID field can be used to specify a document directly, in this case using Document_ID=100, and all images from this document are captured with the scanning characteristics of the document.

Some functions provided by the API are described below:

Init—parses the configuration file 30 and dynamically creates a data header 16 including a linked list of all the document set details for use by the other functions.

CreateCaptureWindow—this function is not very useful in a fixed flatbed scanner embodiment but is present because a calling application 20 may expect it. Such an application will know that it is connected to a capture device which can show a preview of a live scan in the capture window.

CaptureImage—Specifies the image required by setting the image descriptor structure with the required Document_Set_ID, Document_ID and Image_ID. The image information is found in the data header 16 and the image's location on the scanner is set via the scanner module 14 interface to the scanner. The scanner 40 returns a bitmap image which is then parcelled into a suitable data structure 18 and returned to the application.

CaptureImageSet—Specifies an image set required by specifying Document_Set_ID and the Document_ID values. The scanned image will include all the images described as part of the document. This scanned image is at the resolution and colour depth specified in the <document description> section of the configuration file. The single scanned image is processed to get each individual image from the single scan. This processing, described below, includes colour and resolution reduction where a "cropped out" images characteristics differ from the single scanned image.

CaptureDocumentImageSet—very similar to CaptureImageSet except the images captured may be across several documents within the document set. The image descriptor structure is used to determine the images required but StartIndex and EndIndex are also used to reference sub-sets of images within documents and documents with the document set.

FreeImage—Takes a pointer to the image data structure from the data header 16 and frees any memory 18 required to hold that image.

FreeImageSet—Takes a pointer to the image set from the data header 16 and frees the memory 18 required to hold the images and the header for those images.

FreeImageSetHeader—Just frees the header 16 for the images. This enables an application 20, which stores acquired image information separately from the kernel 10, to free memory 16 within the kernel 10. The memory holding image data is freed individually by calls to FreeImage.

Terminate—ensures all memory held for image and document details and also images is freed, then closes the document scanning system.

Examples of image processing functions, refer to above, performed within the document scanning system according to the invention are described below.

Split out to separate images.

The scanned image is split into its component images each with resolution and colour depth described in the configuration file and a structure pointing to each individual image is returned to the application 20.

The image split is achieved by manipulating the single scanned image to crop out blocks of pixels calculated from the information provided for each image in the configuration file. The single scanned image pixel resolution (in dots per inch) is used as a multiplier with the imperial measurements of the position of the image to crop from the single large image.

Resolution Reduction.

A change of resolution occurs if the scanned image is of greater resolution than that required for an individual image. The document scanning system includes a module (not shown) which takes a proportional number of pixels out of the image in the X and Y directions. This module follows the simple proportion of the resolution of the single scanned image (Is) over the resolution of the required image (It) to generate a reduction factor Rf=Is/It. Rf is then used in multiple additions to get the offset into the array of the pixels which are then copied to the required image.

Colour Depth Decrease.

A change of colour depth occurs when the scanned image colour depth is greater than that required. In one decrease, the scanned image is scaled down from 24 bit colour to 8 bit grey scale by use of a common known algorithm to take a weighted average value of each of the red, blue and green components of the colour pixel and scaling it to the 0 to 255 value of a grey-scale pixel. The algorithm follows;

$$grey\_pixel\_value=0.3*Red\ Value+0.59*Green\ value+0.11*Blue\ value$$

Colour depth change also occurs down to monochrome (1 bit black or white). This occurs from grey scale and uses a simple test to determine if the value in the grey-scale pixel is above or below a white threshold value. If so then the bit is set to white. When converting from grey scale to monochrome, the monochrome values are converted to one bit [0 or 1]. Eight grey scale bytes are therefore compressed to one byte in the process. When the comparisons are performed eight bytes of grey scale are looked at consecutively to fill the one byte of black and white data.

In the present embodiment conversions from 24 bit colour to monochrome require that the image is processed to grey-scale first.

Signature Centering.

Where an image is of the class "signature", the actual signature is found within an image cropped from a scanned image and a rectangle defining an area that the signature is within is moved to a central position in the area of image captured. The signature is usually signed on a white background so the new image is just the black and grey of the pen strokes on a white background.

The signature is found by progressively incrementing the upper most, leftmost, rightmost and lower pixel positions until nominally "black" pixels are found within the scanned image. These pixel references are then used to define a rectangle containing the signature. Centering is a case of taking the signature width and height from the original width and height, dividing by two and using the answer to offset into the new area from the top left position.

It will be seen that if a single image is to be acquired, then the scanning characteristics used by the above functions will be those specified for the image in the configuration file 30; if a number of images within a document are to be acquired, then the scanning characteristics will be those of the document; whereas if images from a number of documents are to be acquired, then the scanning characteristics will be those of the document set.

Where a scanned image includes more than one image, then the kernel 10 stores the appropriate portion of the scanned image in a temporary buffer 17 before adjusting the colour depth and resolution of the acquired image to the characteristics specified in the configuration file using the algorithms described above. In FIG. 3, for example, all of the images of the document set of FIG. 2 are scanned at a particular colour depth and resolution. Image 2 of Document 2, however, needs only to be stored in memory 18 at a lower colour depth, whereas Image 2 of Document 3 need only to be stored at a lower resolution, and so the kernel carries out the colour depth and resolution change before finally placing the data for these images in memory 18.

This enables an application 20 to acquire many images in a single scan at a required colour depth and resolution. If on the other hand a contrast and brightness for a particular image are critical, the application 20 can call the CaptureImage function which will immediately acquire a single image at its optimum brightness and contrast as specified in the data header 16 for the image.

It will be seen that the term "image" should be broadly interpreted to include any area of a scanned image that is to be acquired. An image could, for example, be an area of text, which may need to be acquired before optical character recognition software processes the image to extract ASCII codes for the text.

TABLE 1

Sample Configuration File

```
# lines beginning with '#' are comments
# XPosition, YPosition, XSize and YSize are in inches
# Brightness and Contrast values from -125 to 125
(scanner default is 0)
# Resolution value is from 12 to 2400 (scanner default is 300)
# CaptureMode values are 0 for black and white, 1 for 8-bit Gray scale
# All XPosition, YPosition dimensions are absolute references points
# against the top left of the scanner
DOCUMENT_SET_START
    DOCUMENT_SET_ID 1000
    DOCUMENT_SET_NAME Peru Citizen
# values optimised for images across the set of documents
    XPosition           0.0
    YPosition           0.0
    XSize               8.25
    YSize               11.65
    Brightness          0
    Contrast            0
    Resolution          500
    CaptureMode         2
DOCUMENT_START
DOCUMENT_ID             100
DOCUMENT_NAME       Peru Formal ID
# values optimised for images across the document
    XPosition           0.0
    YPosition           7.65
    XSize               8.25
    YSize               4.0
    Brightness          0
```

TABLE 1-continued

Sample Configuration File

```
    Contrast            0
    Resolution          500
    CaptureMode         2
    IMAGE_START
    IMAGE_ID 10
    IMAGE_NAME      Photograph
    XPosition           4.6
    YPosition           7.80
    XSize               1.60
    YSize               2.00
    Brightness          -2
    Contrast            10
    Resolution          300
    CaptureMode         2
    Class               2
    SubClass            0
    Impression          2
    IMAGE_START
    IMAGE_ID 20
    IMAGE_NAME      Signature
    XPosition           0.4
    YPosition           7.9
    XSize               3.7
    YSize               1.2
    Brightness          0
    Contrast            0
    Resolution          150
    CaptureMode         0
    Class               3
    SubClass            0
    Impression          2
    IMAGE_START
    IMAGE_ID 30
    IMAGE_NAME      Barcode
    XPosition           6.10
    YPosition           8.50
    XSize               2.15
    YSize               0.80
    Brightness          0
    Contrast            0
    Resolution          500
    CaptureMode         1
    Class               4
    SubClass            0
    Impression          2
    IMAGE_START
    IMAGE_ID 40
    IMAGE_NAME      Left FP 1
    XPosition           0.7
    YPosition           10.2
    XSize               1.0
    YSize               1.4
    Brightness          0
    Contrast            0
    Resolution          500
    CaptureMode         1
    Class               1
    SubClass            7
    Impression          2
    IMAGE_START
    IMAGE_ID 70
    IMAGE_NAME      Right FP 1
    XPosition           4.4
    YPosition           10.2
    XSize               1.0
    YSize               1.4
    Brightness          0
    Contrast            0
    Resolution          500
    CaptureMode         1
    Class               1
    SubClass            2
    Impression          2
```

What is claimed is:

1. A document scanning system adapted to communicate with a scanner to provide scanning characteristics and scanning coordinates for a scan and to receive a scanned image from said scanner, said document scanning system being adapted to process scanning requests defining a set of images to be scanned and to calculate said scanning characteristics and scanning coordinates from a document set definition comprising one or more image definitions, each image definition including an associated set of coordinates and scanning characteristics for the or each image.

2. A document scanning system as claimed in claim 1 wherein a configuration file stores said document set definition and said document scanning system comprises a parser module adapted to read said configuration file.

3. A document scanning system as claimed in claim 1 wherein said system is adapted to communicate with an application, said application being adapted to generate said scanning requests.

4. A document scanning system as claimed in claim 1 wherein the set of scanning characteristics for the or each image comprises a resolution, a colour depth, a brightness and a contrast characteristic.

5. A document scanning system as claimed in claim 4 wherein said document set definition comprises one or more document definitions, the or each document definition comprising one or more component image definitions.

6. A document scanning system as claimed in claim 5 wherein the or each document definition comprises an associated set of coordinates and scanning characteristics for the or each document.

7. A document scanning system as claimed in claim 6 wherein said document set definition includes an associated set of coordinates and scanning characteristics for the document set.

8. A document scanning system as claimed in claim 7 wherein said set of document set scanning characteristics comprises an associated resolution, colour depth, brightness and contrast characteristic, said resolution and colour depth characteristics being maximum values across the or each component image of the document set and said brightness and contrast characteristics being optimum values across the or each component image of the document set.

9. A document scanning system as claimed in claim 6 wherein said set of scanning characteristics for the or each document comprises an associated resolution, colour depth, brightness and contrast characteristic, said resolution and colour depth characteristics being maximum values across the or each component image of the document and said brightness and contrast characteristics being optimum values across the or each component image of the document.

10. A document scanning system as claimed in claim 1 wherein the or each set of coordinates comprises x and y coordinates defining an associated origin and offset for the or each image.

11. A document scanning system as claimed in claim 1 wherein said request comprises a document set identifier and/or a document identifier and/or an image identifier.

12. A document scanning system as claimed in claim 11 wherein said request comprises indices defining a range of documents or a range of images.

* * * * *